(12) United States Patent
Boutaghou et al.

(10) Patent No.: US 7,054,108 B2
(45) Date of Patent: May 30, 2006

(54) SLIDER FOR A DATA STORAGE DEVICE HAVING IMPROVED STICTION CONTROL WITH REDUCED INTERFERENCE WITH AIR BEARING PRESSURIZATION

(75) Inventors: Zine-Eddine Boutaghou, Vadnais Heights, MN (US); Scott E. Ryun, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/135,594

(22) Filed: Apr. 30, 2002

(65) Prior Publication Data

US 2003/0067719 A1    Apr. 10, 2003

Related U.S. Application Data

(60) Provisional application No. 60/328,001, filed on Oct. 10, 2001.

(51) Int. Cl.
*G11B 5/60* (2006.01)
*G11B 17/32* (2006.01)
*G11B 21/21* (2006.01)

(52) U.S. Cl. ................ 360/236.5; 360/235.4
(58) Field of Classification Search ............ 360/236.5, 360/235.4, 235.7, 235.8, 236, 236.2, 236.3, 360/236.6, 236.9, 237
See application file for complete search history.

(56) References Cited

U.S. PATENT DOCUMENTS

| | | | |
|---|---|---|---|
| 4,212,044 A | 7/1980 | Plotto | 360/103 |
| 4,553,184 A | 11/1985 | Ogishima | 360/103 |
| 4,636,894 A | 1/1987 | Mo | 360/103 |
| 4,646,180 A | 2/1987 | Ohtsubo | 360/103 |
| 4,757,402 A | 7/1988 | Mo | 360/103 |
| 4,802,042 A | 1/1989 | Strom | 360/103 |
| 4,961,121 A | 10/1990 | Astheimer et al. | 360/103 |
| 5,200,868 A | 4/1993 | Chapin et al. | 360/103 |
| 5,345,353 A | 9/1994 | Krantz et al. | 360/103 |
| 5,572,386 A | 11/1996 | Ananth et al. | 360/103 |
| 5,742,518 A | 4/1998 | Gui et al. | 364/508 |
| 5,751,517 A * | 5/1998 | Agarwal | 360/235.4 |
| 5,841,608 A | 11/1998 | Kasamatsu et al. | 360/103 |
| 5,940,249 A * | 8/1999 | Hendriks | 360/235.6 |
| 5,991,118 A * | 11/1999 | Kasamatsu et al. | 360/236.6 |
| 6,055,127 A * | 4/2000 | Boutaghou et al. | 360/236 |
| 6,188,547 B1 | 2/2001 | Gui et al. | 360/236.5 |

(Continued)

FOREIGN PATENT DOCUMENTS

DE    19531746 A1 *    3/1996

(Continued)

OTHER PUBLICATIONS

"A stiction model for a head-disc interface of a rigid disk drive" by J. Gui et al., *J. Appl. Phys.* vol. 78(6), pp. 4206-4217, Sep. 15, 1995.

(Continued)

*Primary Examiner*—Craig A. Renner
(74) *Attorney, Agent, or Firm*—Westman, Champlin & Kelly P.A.

(57) ABSTRACT

A slider for carrying transducers for a data storage device including a stiction control trench. The stiction control trench includes a boundary dimension to reduce creep or interference of the pressurized profile of the raised bearing surface to provide stiction control while limiting interference with the hydrodynamic bearing design.

20 Claims, 11 Drawing Sheets

U.S. PATENT DOCUMENTS

| | | | |
|---|---|---|---|
| 6,396,663 B1 * | 5/2002 | Kasamatsu | 360/236.5 |
| 6,424,494 B1 * | 7/2002 | Koishi | 360/236.5 |
| 6,466,410 B1 * | 10/2002 | Polycarpou et al. | 360/236.6 |
| 6,603,639 B1 * | 8/2003 | Polycarpou et al. | 360/236.6 |

FOREIGN PATENT DOCUMENTS

| | | | |
|---|---|---|---|
| JP | 61-204877 A | | 9/1986 |
| JP | 63-231775 A | | 9/1988 |
| JP | 01-116957 A | | 5/1989 |
| JP | 01-227215 A | | 9/1989 |
| JP | 05074093 A | * | 3/1993 |
| JP | 07065342 A | * | 3/1995 |
| JP | 08069674 A | * | 3/1996 |

OTHER PUBLICATIONS

"Stiction Free Slider for the Smooth Surface Disk" by Y. Kasamatsu et al., *IEEE Transactions on Magnetics*, vol. 31, No. 6, Nov. 1995.

* cited by examiner

SLIDER FOR A DATA STORAGE DEVICE HAVING IMPROVED STICTION CONTROL WITH REDUCED INTERFERENCE WITH AIR BEARING PRESSURIZATION

CROSS-REFERENCE TO RELATED APPLICATION

This application claims priority from U.S. Provisional Application Ser. No. 60/328,001 filed on Oct. 10, 2001 for inventors Zine-Eddine Boutaghou and Scott Edward Ryun and entitled "STICTION MITIGATION VIA NON-PRESSURE REGULATING TRENCHES".

FIELD OF THE INVENTION

The present invention relates generally to data storage devices, and more particularly but not by limitation to an air bearing surface having trench(es) to provide stiction control with reduced boundary pressure creep across a pressure profile of the air bearing surface.

BACKGROUND OF THE INVENTION

Data storage devices include heads having transducer elements to read data from or write data to the disc. Heads include a slider which is supported on a disc surface for contact-starts and stops (CSS) or on a ramp for load/unload. For operation, rotation of the disc creates an air flow along an air bearing surface of the slider for read/write operations. The disc includes a lubricant film or layer that creates a stiction force between the slider and the disc surface for CSS or for head disc interface. Stiction between the slider and disc surface can increase power requirements for "spin-up" or can lead to failure of the data storage device. Trenches formed on a raised bearing surface of the slider to reduce stiction can interfere with pressurization of the air bearing surface affecting fly height parameters or read/write operation of the head. Embodiments of the present invention provide solutions to these and other problems, and offer other advantages over the prior art.

SUMMARY OF THE INVENTION

The present invention relates to a slider for carrying transducers for a data storage device including a stiction control trench. The stiction control trench includes a width or boundary dimension to reduce creep or interference with the pressure profile of the raised bearing surface to limit interference with hydrodynamic bearing operation. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
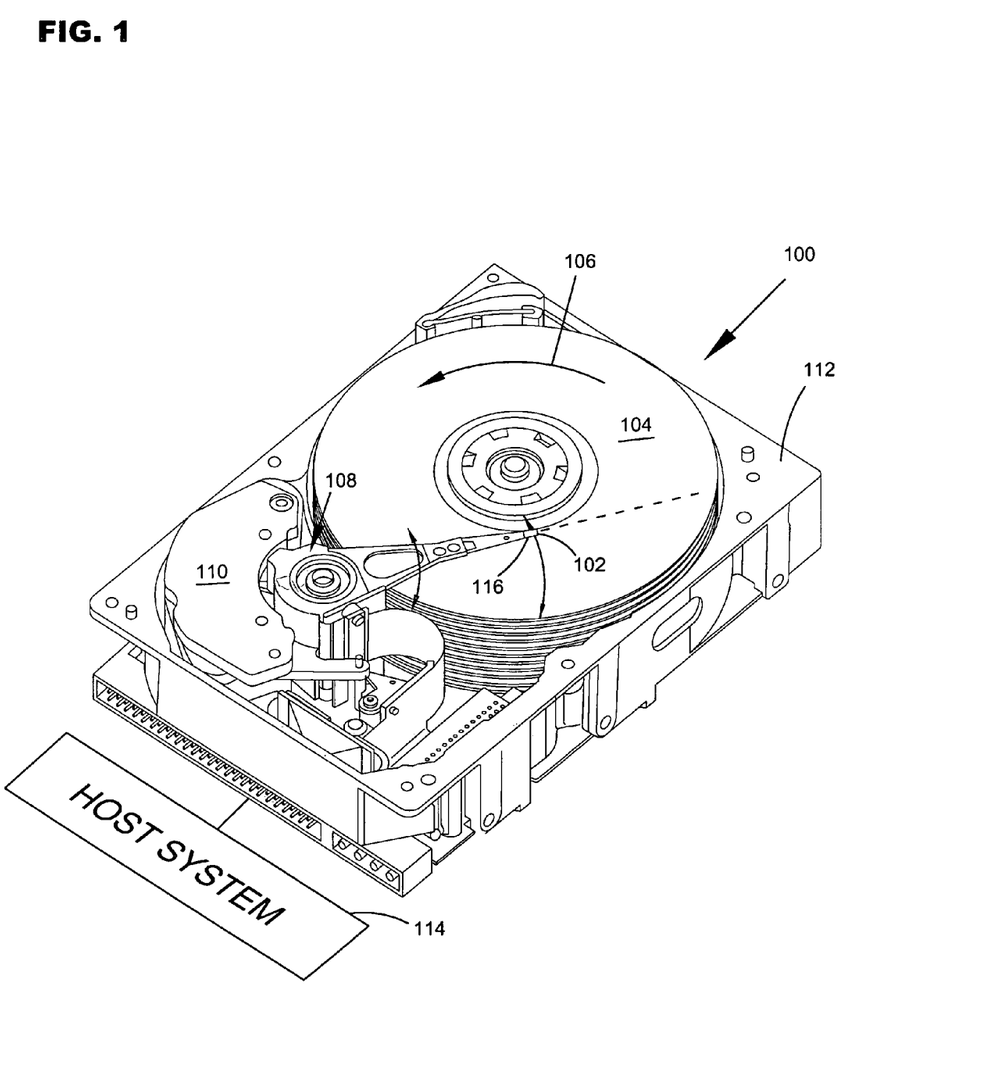
FIG. 1 is a perspective illustration of a data storage device.

FIG. 1 illustrates a data storage device 100 in which embodiments of the present invention are useful. The data storage device 100 includes a head 102 which reads data from or writes data to a disc 104. In the illustrated embodiment, the data storage device 100 includes a plurality of discs 104 supported for co-rotation as illustrated by arrow 106. A plurality of heads 102 are coupled to an actuator 108 to interface with the plurality of discs 104 in a disc stack. Discs 104 are coupled to a spindle motor (not shown in FIG. 1) to rotate the discs 104 for operation. The actuator 108 is powered by a voice coil motor 110 to move the heads 102 between selected data tracks for read/write operations. As shown, components of the data storage device 100 are coupled to a base chassis 112 and the device 100 is coupled to a host system 114 as schematically shown for operation.

Figure 2:
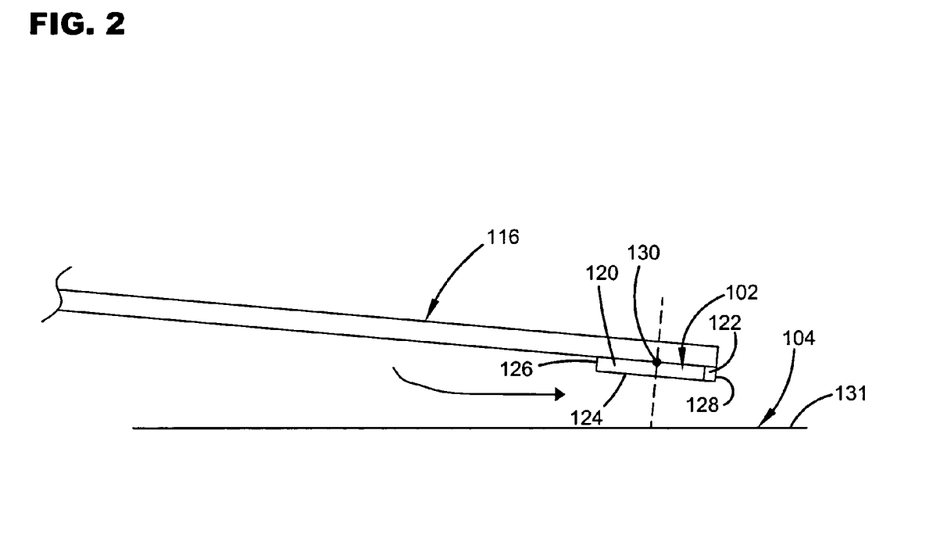
FIG. 2 is a schematic illustration of a slider coupled to a suspension assembly.

Head 102 is coupled to the actuator 108 through a suspension assembly 116 including a suspension arm and a gimbal spring (not shown). As illustrated in FIG. 2, the head 102 includes a slider 120 which carriers a transducer element 122 (illustrated schematically) to read data from or write data to the disc 104. Transducer element 122 includes, for example, inductive, magnetoresistive, tunneling magneto-resistive, or magneto-optical transducer elements. For operation, rotation of the disc 104 creates an air flow along an air bearing surface 124 of the slider from a leading edge 126 to a trailing edge 128 of the slider 120 as shown in FIG. 2. Air flow along the air bearing surface 124 creates a hydrodynamic lifting force. The suspension assembly 116 includes a load portion that supplies a pre-load force to the slider at a load point 130. The hydrodynamic lifting force of the air bearing surface 124 is countered by the preload force supplied to the slider 120 by the suspension assembly 116 to define in part a fly height $H_{fly}$ of the slider 120 above a surface 131 of the disc 104 for read/write operations.

Figure 3:
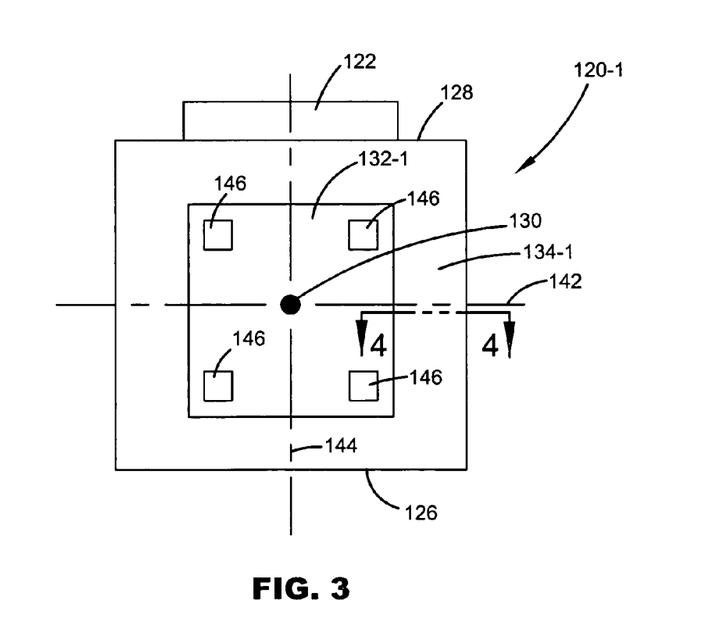
FIG. 3 is schematic illustration of a slider including a raised bearing surface.
Figure 4:
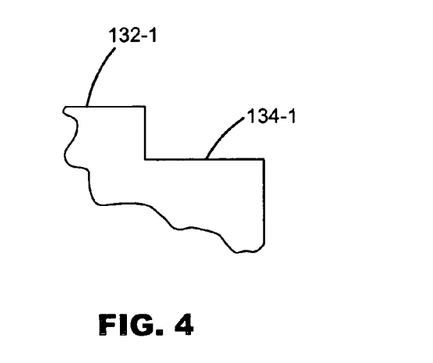
FIG. 4 is a sectional view taken along line 4—4 of FIG. 3 to illustrate an interface between a raised bearing surface and a recessed bearing surface.

FIG. 3 schematically illustrates an air bearing slider 120-1 including a raised bearing surface 132-1 (illustrated schematically) elevated above a recessed bearing surface 134-1 as shown in FIG. 4. The raised bearing surface 132-1 includes a pressure portion and a boundary portion along a boundary of the raised bearing surface 132-1 with the recessed bearing surface 134-1. As previously described, air flows along the air bearing surface to provide a hydrodynamic lifting force and the slider is supported to pitch and roll relative to the load point 130 to follow the topography of the disc surface for read/write operations. In particular as shown, the slider pitches about a pitch axis 142 relative to load point 130 and rolls relative to a roll axis 144 relative to the load point 130. The slider typically flies at a pitch angle relative to the disc surface 131 so that the trailing edge 128 of the slider flies closer to the disc surface than the leading edge 126 for read/write operations.

Prior to operation, the slider is supported on the disc surface for CSS or is supported on a ramp for ramp load/unload. The disc surface is covered with a thin lubricant layer to protect the disc surface from wear. The lubricant layer creates a stiction force between the slider and the disc surface at the head disc interface. For a CSS interface, sufficient power must be supplied to overcome the stiction force between the slider and disc surface (lubricant layer) for "spin up" to occur. Increased stiction can increase power requirements for "spin-up" or cause failure of the device. During ramp load/unload, the head can fall from the ramp creating a stiction force between the slider and disc surface increasing power requirements or causing failure of the device. As schematically shown in FIG. 3, prior air bearing sliders include integrated landing pads 146 to reduce contact area or stiction. Pads 146 can be arranged in different patterns and for example, can be positioned proximate to the leading edge or proximate to both the leading and trailing edges of the slider as shown.

Figure 5:
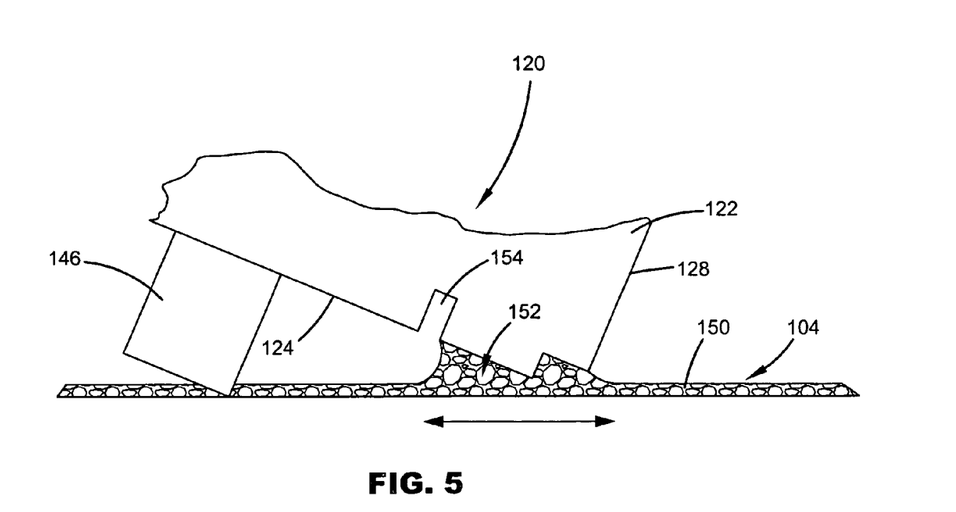
FIG. 5 is a schematic illustration of meniscus growth along a bearing surface of a tipped slider.

A real disc drive density is increasing and slider fly heights are decreasing. Landing pads 146 are typically recessed from the trailing edge 128 of the slider 120 to limit contact interference or head-disc interface. The recessed position of the pad 146 (or absence of a pad) relative to the trailing edge 128 increases the propensity of the slider to tip as illustrated in FIG. 5. As shown, interface between the trailing edge 128 of the tipped slider and lubricant film layer 150 on the disc 104 creates a meniscus effect which increases stiction between the slider and disc surface. In particular, lubricant is dragged from the contact area between the slider and disc surface along a trailing edge portion or surface of the slider via capillary pressure to form a meniscus area 152. The magnitude of the stiction is proportional to the meniscus area 152. To reduce meniscus effect, trenches 154 are included on the bearing surface to reduce capillary pressure and limit meniscus growth.

Figure 6:
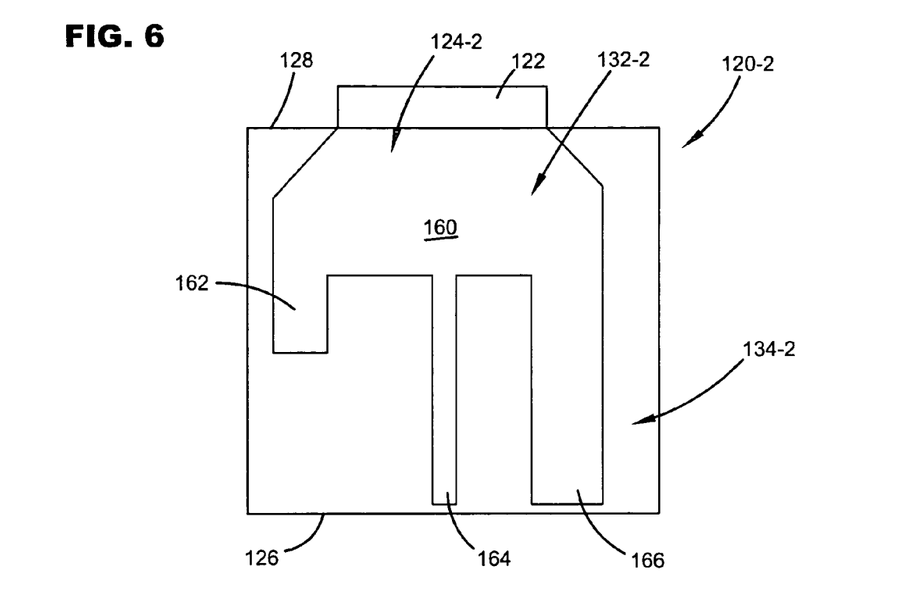
FIG. 6 is a schematic illustration of a bearing surface of a slider including a raised bearing surface having multiple raised portions.

The present invention relates to air bearing trench(es) to reduce meniscus growth having a relatively small width dimension to limit interference with the pressure profile of the air bearing surface. FIG. 6 schematically illustrates an embodiment of an air bearing slider 120-2 having a raised bearing surface 132-2 and a recessed bearing surface 134-2. In the particular embodiment shown, the raised bearing surface 132-2 includes a main portion 160, a shortened inner rail portion 162, a center rail portion 164 and an outer rail portion 166. As previously explained, for operation rotation of the disc creates an air flow along the bearing surface of the slider to create the hydrodynamic lifting force.

Figure 7:
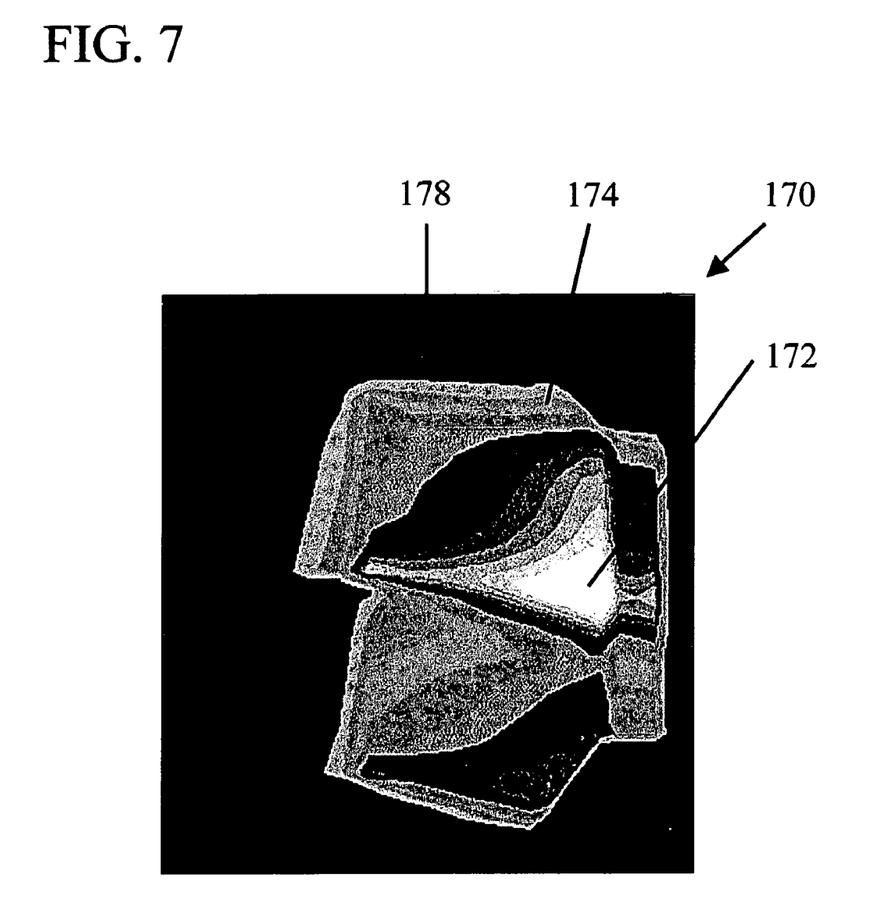
FIG. 7 is a pressure profile for the bearing surface of the slider of FIG. 6.

FIG. 7 illustrates a pressure profile 170 for air flow along the air bearing surface 124-2 of slider 120-2. As shown, the pressure profile 170 includes raised pressure portion 172, a boundary pressure portion 174 and a recessed pressure portion 178. The raised pressure portion 172 includes a plurality of high pressure gradients across the raised bearing surface (portions 160, 162, 164, 166) and the recessed pressure portion 178 has a relatively low pressure gradient. The boundary pressure portion 174 includes a plurality of lower pressure gradients at the boundary interface between the high pressure profile of the raised bearing surface 132-2 and the lower pressure profile of the recessed bearing surface 134-2.

Figure 8:
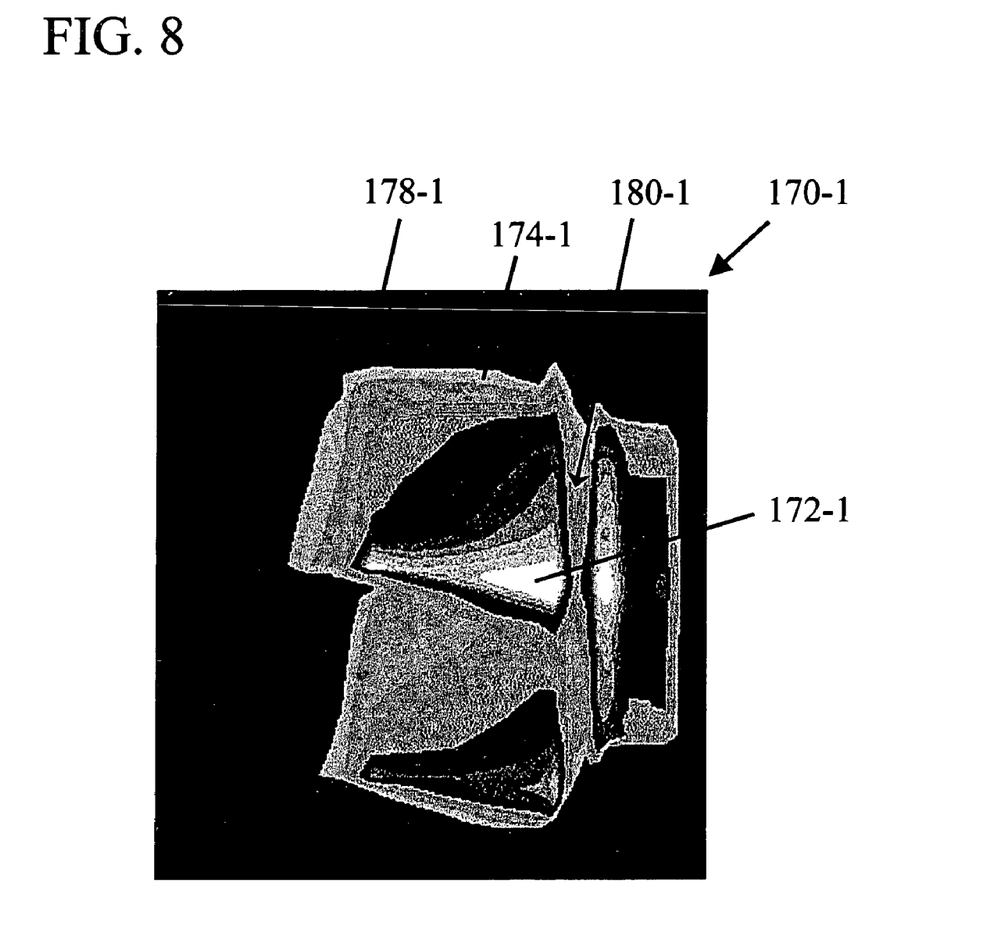
FIG. 8 is a pressure profile for a bearing surface having a boundary pressure creep or notch along the pressurized bearing surface.

As previously described, trench(es) are formed in the air bearing surface to limit meniscus growth along the bearing surface. As illustrated in FIG. 8, a trench formed in the air bearing surface can influence the pressure profile of the air bearing. FIG. 8 illustrates a pressure profile 170-1 including raised pressure portion 172-1, boundary pressure portion 174-1 and recessed pressure portion 178-1 for an air bearing surface having a transverse trench 154 formed on the air bearing surface having a width along a longitudinal length of the slider. As shown in FIG. 8, the pressure profile 170-1 includes a boundary pressure creep or notch 180-1 across the pressure profile 172-1 of the raised bearing surface which degrades pressurization of the air bearing affecting dynamic operation of the slider.

Figure 9:
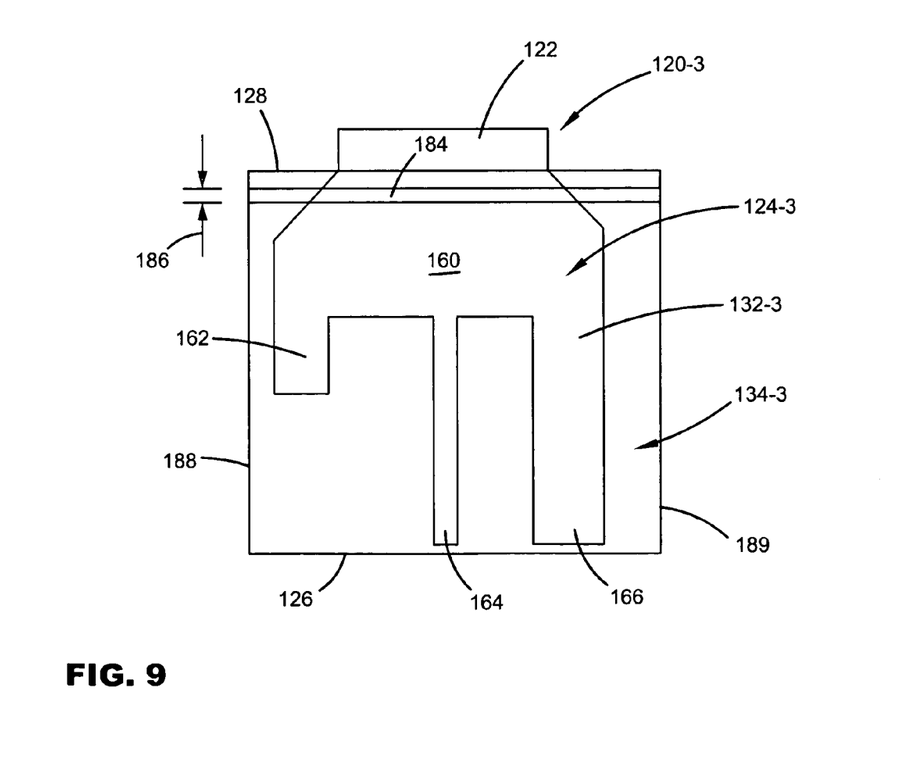
FIG. 9 is a schematic illustration of an embodiment of a bearing surface of a slider including a trench for stiction control with reduced pressurization interference.
Figure 10:
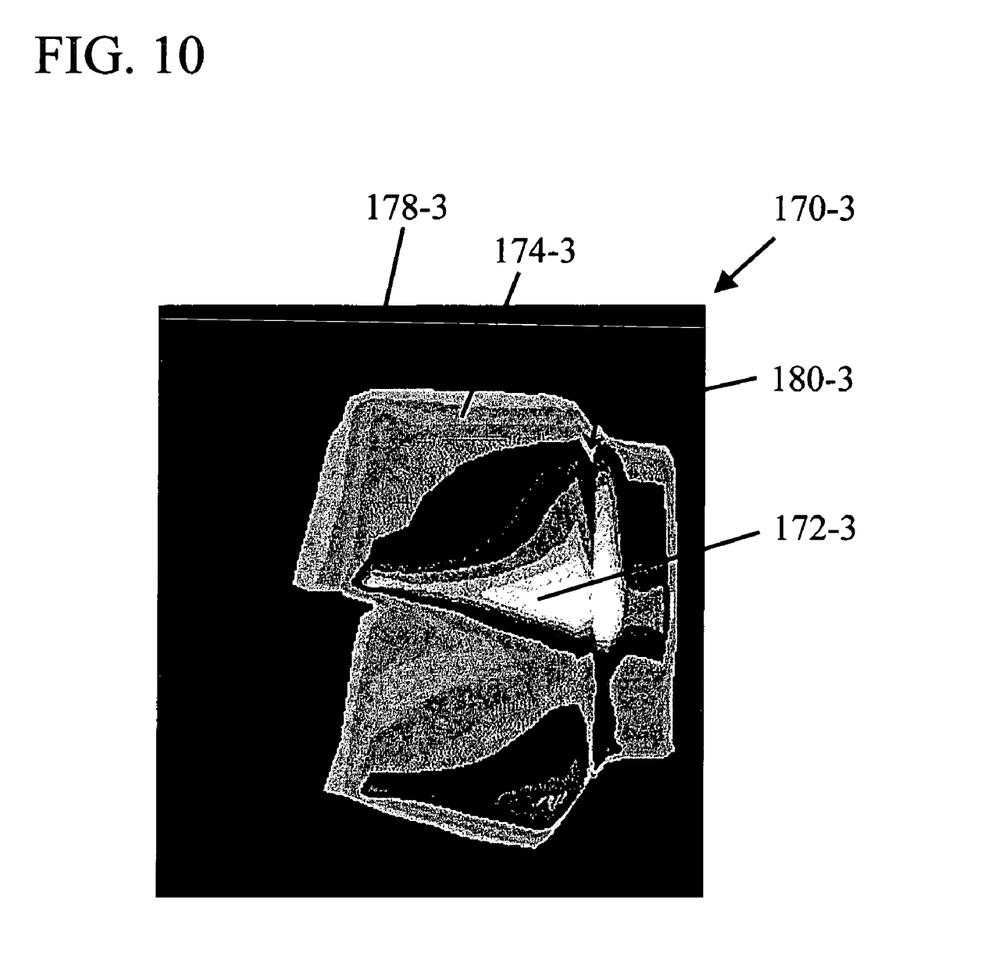
FIG. 10 is a pressure profile for the bearing surface of FIG. 9 having reduced pressurization interference.

The present invention provides a stiction control trench having a trench profile to limit or reduce boundary pressure creep across the pressure portion 172 of the raised bearing surface as shown in FIGS. 9–10. In the embodiment shown, a transverse trench 184 is formed across a trailing edge portion of the air bearing surface of the slider 120-3. The trench 184 has a narrow width dimension 186 along a longitudinal length of the slider between the leading and trailing edges 126, 128 of the slider 120-3 to limit pressure creep of the boundary pressure profile across the pressure profile of the raised bearing surface 132-3 as shown in the pressure profile 170-3 of FIG. 10, including a raised pressure portion 172-3, boundary pressure portion 174-3 and a recessed pressure portion 178-3. In particular, the trench 184 has a width dimension 186 of approximately 5 microns or less which as shown in FIG. 10 contains boundary pressure creep at the boundary interface of the trench as illustrated by portion 180-3 of the pressure profile 170-3 to limit interference with air bearing pressurization. In the illustrated embodiment shown in FIG. 10, the 184 trench has a width dimension 186 of approximately 1 micron.

As shown in FIG. 9, the transverse trench 184 is formed on air bearing surface 124-3 and extends between opposed sides 188, 189 of the slider along the raised bearing surface 132-3 and recessed bearing surface 134-3 to limit meniscus growth along the air bearing surface between opposed sides 188, 189 of the slider.

Trenches 184 can be formed by a focus ion beam (FIB) etching process, photo-lithographic etching process or other etching processes. Multiple trenches extending between opposed sides 188, 189 can be spaced along a longitudinal length of the trailing edge portion of the slider to provide desired stiction control as explained and application is not limited to the single trench shown.

Although, FIG. 9 illustrates application of the present invention with respect to a particular bearing design, it should be understood that application is not limited to the particular bearing design shown. For example, the present invention can apply to various bearing designs including by example and not by limitation air bearings including opposed spaced raised bearing rails or including opposed shortened side rails and a center rail.

In one embodiment, the present invention is applied to various bearing designs by forming a trench along a trailing edge portion of the air bearing surface proximate to a meniscus growth surface as described. Multiple trenches can be formed on multiple spaced raised bearing surfaces (for example, trenches can be formed on opposed side rails of a two rail design slider) or a trench can be formed on a single raised bearing surface. Trenches can be orientated in various directions and application is not limited to the particular trench(es) shown. The various orientated trench(es) include a boundary width dimension at a boundary portion of the raised bearing surface with the recessed bearing surface of approximately 5 microns or less. Alternatively the trench can have a boundary width dimension of approximately 1 micron or less.

Figure 11:
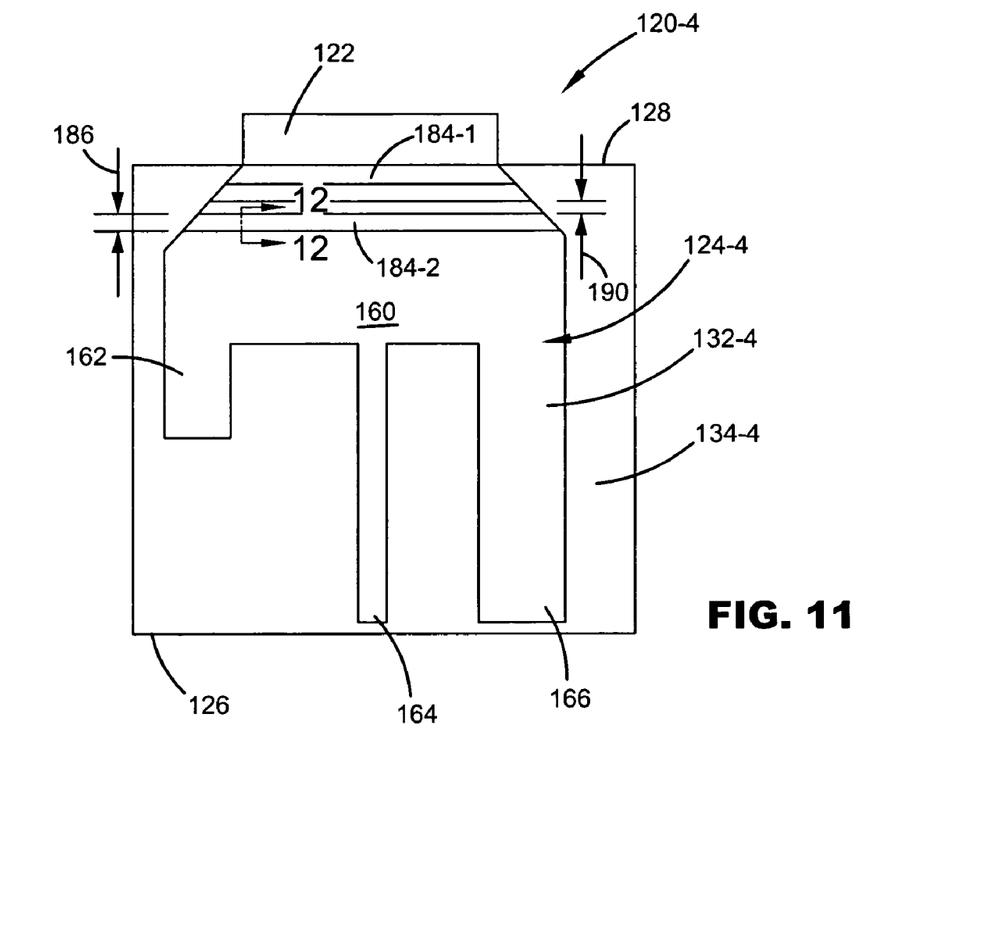
FIG. 11 is a schematic illustration of an embodiment of a bearing surface of a slider including a plurality of trenches along a raised bearing surface for stiction control with reduced pressurization interference.
Figure 12:
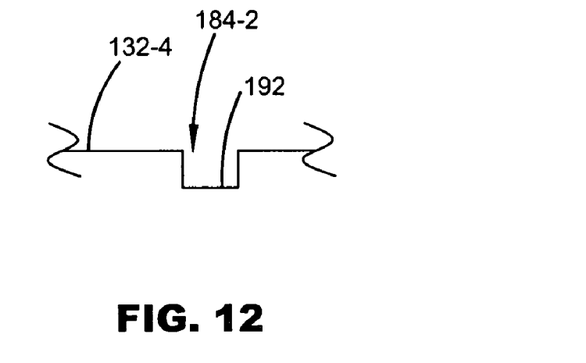
FIG. 12 is a cross-sectional view taken along line 12—12 of FIG. 11 to illustrate a recessed dimension of the trench.

FIGS. 11–12 illustrate a slider embodiment 120-4 including a plurality of spaced trenches 184-1, 184-2 on an air bearing surface 124-4 including raised bearing surface 132-4 and recessed bearing surface 134-4. In the illustrated embodiment, the plurality of spaced trenches 184-1, 184-2 are formed on the raised bearing surface 132-4 and have a width dimension 186 of approximately 5 microns or less to contain boundary pressure creep to limit interference with pressurization of the raised bearing surfaces as previously described. The trenches 184-1, 184-2 are longitudinally spaced a dimension 190 of at least approximately 1 micron to decouple the recessed surfaces 192 (recessed surface 192 of trench 184-2 shown in FIG. 12) of the trenches 184-1, 184-2, having a reduced pressure profile to provide desired stiction control without significant affect to the pressurized bearing surfaces.

Figure 13:
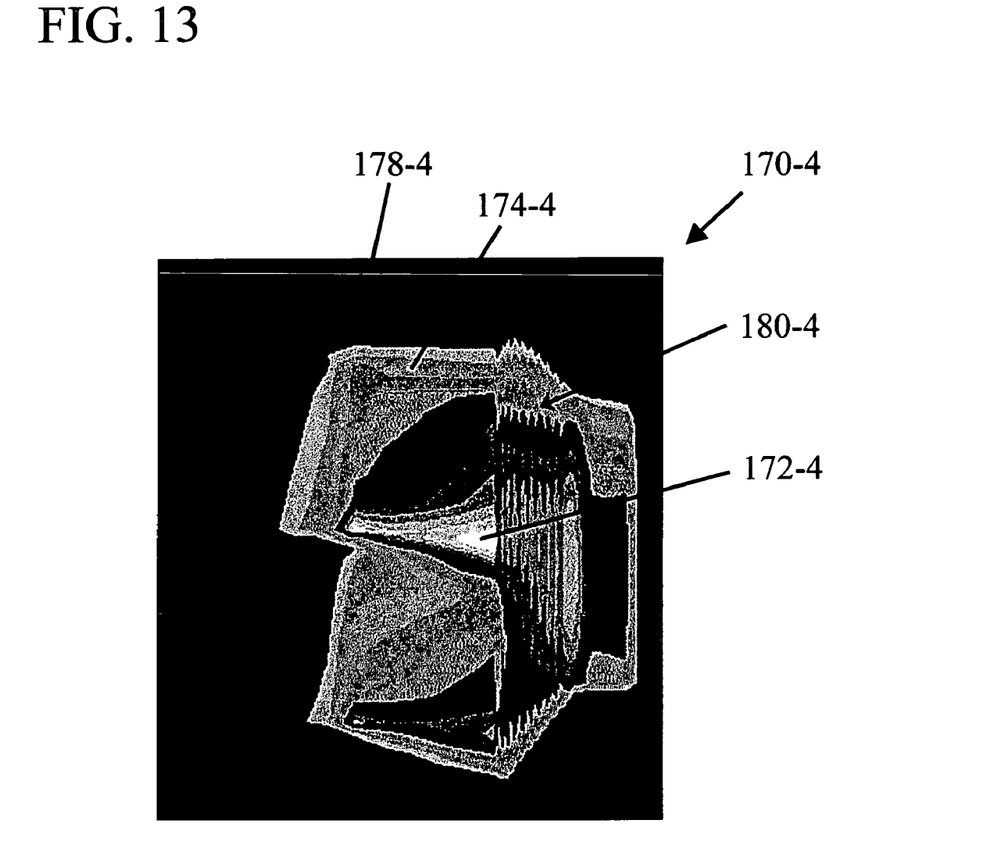
FIG. 13 is a pressure profile for a bearing surface having multiple spaced trenches having reduced pressurization interference.

The depth of the trenches 184-1, 184-2 can be approximately 50 Å–100 Å to optimize stiction control and boundary pressure creep. In particular, the trench depth is sufficiently shallow to minimize interference with pressurization. FIG. 13 illustrates a pressure profile 170-4 for an air bearing slider including a plurality of spaced trenches having a profile including a raised pressure portion 172-4, boundary pressure portion 174-4 and a recessed pressure portion 178-4. The profile 170-4 is designed to contain boundary pressure creep at the boundary interface of the trench as illustrated by portion 180-4 of the pressure profile 170-4 to provide stiction control without significant interference with the pressurization of the air bearing of the slider.

Figure 14:
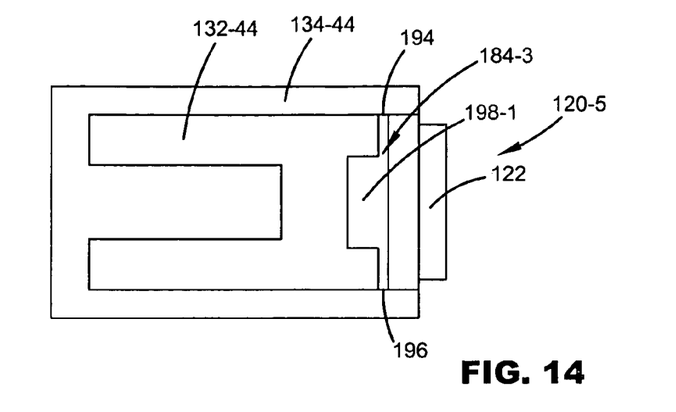
FIGS. 14–18 illustrate various trench embodiments for stiction control with reduced pressurization interference.

FIGS. 14–18 illustrate alternate trench embodiments for a bearing surface of a slider. In particular, as shown in FIG. 14, slider 120-5 including a raised bearing surface 132-44 and a recessed bearing surface 134-44 includes a trench 184-3 having boundary trench portions 194, 196 having a narrow boundary width dimension to contain boundary pressure creep as previously described. The trench 184-3 as shown includes an enlarged intermediate portion 198-1 which in the illustrated embodiment is between the boundary portions 194, 196 having an enlarged intermediate width dimension which is dimensioned to provide desired stiction control. The width dimension for the boundary trench portions 194, 196 is approximately 5 microns or less to reduce boundary pressure creep as previously discussed.

Figure 15:
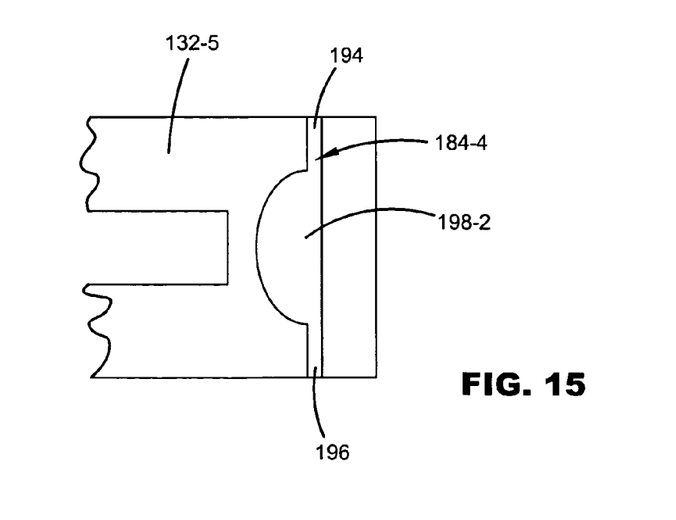

FIG. 15 illustrates another trench embodiment 184-4 for a raised bearing surface 132-5 including boundary trench portions 194, 196 as described and an enlarged intermediate portion 198-2 having an enlarged intermediate width dimension having a rounded profile. The rounded profile of the enlarged intermediate portion 198-2 can be formed with a FIB which forms the rounded profile using a small beam width to form a plurality of stepped etches to cumulatively form the rounded shape.

Figure 16:
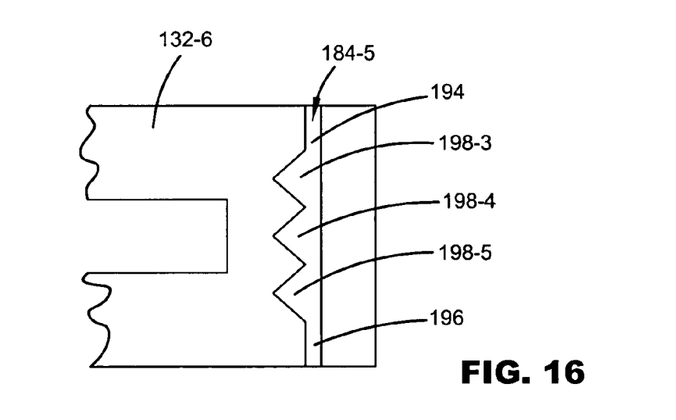
Figure 17:
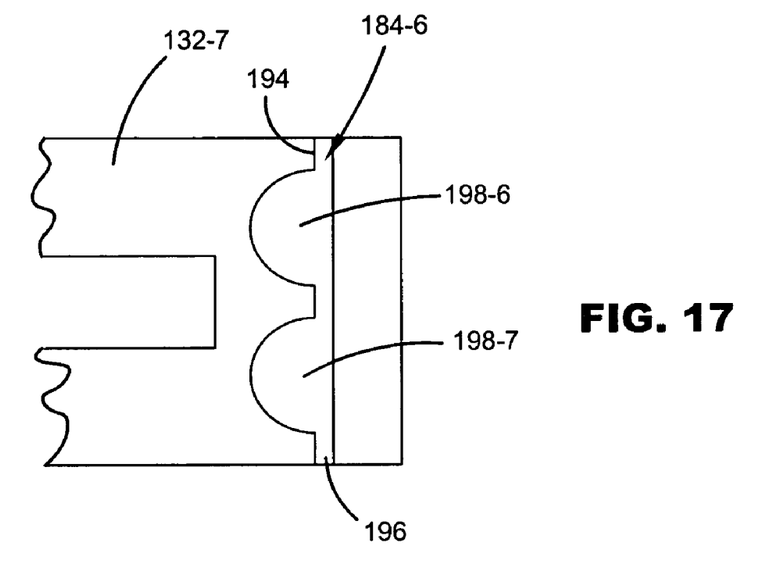
Figure 18:
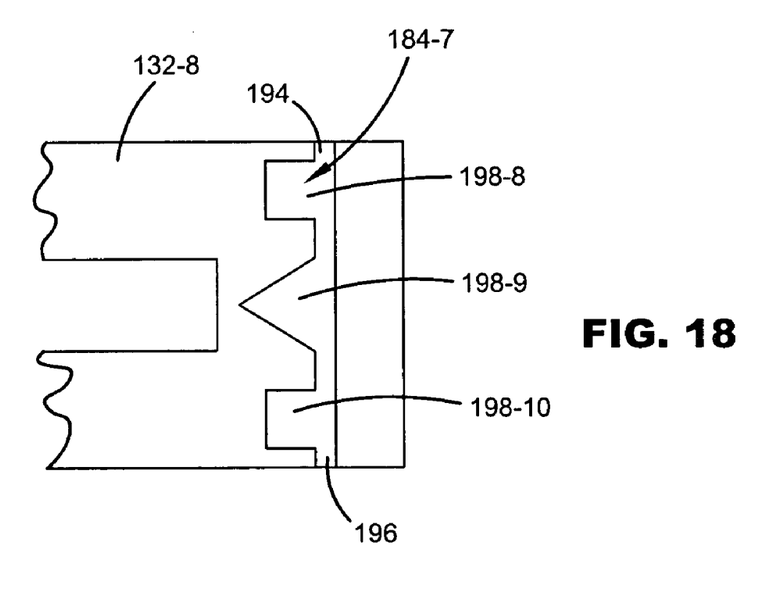

FIGS. 16–18 illustrate various trench embodiments having narrow boundary portions 194, 196 and a plurality of spaced enlarged intermediate portions to provide desired stiction control without compromise to the pressurized air bearing surfaces. The spacing and dimensions of the enlarged intermediate portions can be designed to optimize pressurization and roll parameters of the slider. FIG. 16 illustrates a raised bearing surface 132-6 including trench 184-5. Trench 184-5 includes a plurality of spaced enlarged triangular shaped intermediate portions 198-3, 198-4, 198-5 which are spaced to optimize roll parameters of the slider about the roll axis 144 based upon air bearing dynamics of the air bearing design. FIG. 17 illustrates a raised bearing surface 136-7 including a trench 184-6. Trench 184-6 includes multiple rounded intermediate portions 198-6, 198-7 which are spaced to optimize various air bearing parameters. FIG. 18 illustrates a raised bearing surface 136-8 including trench 184-7. Trench 184-7 includes multiple shaped portions 198-8, 198-9, 198-10 to optimize air bearing performance and stiction control. Although particular trench embodiments are illustrated it should be understood, that application is not limited to the particular shaped trenches shown.

The present invention relates to a slider (such as 120) including an air bearing surface (such as 124) having a trench (such as 184) formed on the bearing surface. The trench (such as 184) includes a narrow boundary or width dimension (186) to contain boundary pressure creep to limit interference with pressurization of the air bearing of the slider.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic data storage device, it will be appreciated by those skilled in the art that the teachings of the present invention can be applied to optical devices without departing from the scope and spirit of the present invention.

What is claimed is:

1. A slider comprising:
   a slider body including a leading edge, a trailing edge and opposed sides;
   a raised bearing surface elevated above a recessed bearing surface and the raised bearing surface having opposed boundary edges and including a pressure step between the raised bearing surface and the recessed bearing surface along the opposed boundary edges;
   at least one trench on the raised bearing surface having a boundary width dimension along the opposed boundary edges of 4 microns or less and a length dimension extending generally transverse to a longitudinal length of the slider body between the leading edge and the trailing edge of the slider body.

2. The slider of claim 1 including a plurality of longitudinally spaced trenches having boundary width dimensions of approximately 1 micron or less.

3. The slider of claim 2 wherein the plurality of trenches are longitudinally spaced at least approximately a micron apart.

4. The slider of claim 1 wherein the at least one trench has a boundary portion and an intermediate portion having an intermediate width dimension larger than the boundary width dimension.

5. The slider of claim 1 wherein the at least one trench extends between the opposed sides of the slider body.

6. The slider of claim 5 wherein the at least one trench extends along the raised bearing surface and the recessed bearing surface between the opposed sides of the slider body.

7. The slider of claim 1 wherein the boundary width dimension is approximately 1 micron or less.

8. A slider comprising:
a slider body including a leading edge and a trailing edge and including a raised bearing surface and a recessed bearing surface and a portion of the raised bearing surface forming a slider-disc interface surface; and
at least one transverse trench on the slider-disc interface surface of the raised bearing surface of the slider body having a width dimension of 4 microns or less and a length dimension extending generally transverse to a longitudinal length of the slider body.

9. The slider of claim 8 wherein the at least one transverse trench is proximate to the trailing edge of the slider body.

10. The slider of claim 8 wherein the slider includes a plurality of longitudinally spaced trenches longitudinally spaced along the raised bearing surface of the slider proximate to the trailing edge of the slider.

11. The slider of claim 8 wherein the at least one transverse trench includes a boundary portion along a boundary of the raised bearing surface and the recessed bearing surface and an intermediate portion on the raised bearing surface having an intermediate width dimension larger than a boundary width dimension along the boundary portion.

12. The slider of claim 8 wherein the width dimension of the at least one trench is approximately 1 micron or less.

13. The slider of claim 8 wherein the at least one transverse trench extends between opposed sides of the slider body.

14. The slider of claim 13 wherein the at least one transverse trench extends along the raised bearing surface and the recessed bearing surface between the opposed sides of the slider body.

15. The slider of claim 8 wherein the slider does not include a projection or pad elevated or extending from the raised bearing surface.

16. A slider comprising:
a slider body including a leading end, a trailing end and a center portion and opposed side portions;
a raised center pad or raised center portion forming a raised bearing surface elevated above a recessed bearing surface on the slider body; and
at least one trench on the raised center pad or the raised center portion of the slider body having a length dimension extending generally transverse to a length of the slider body between a leading edge and a trailing edge of the slider body and the at least one trench having a width dimension along opposed side edges of the raised center pad or raised center portion of approximately 4 microns or less.

17. The slider of claim 16 including a plurality of spaced trenches on the raised center pad or the raised center portion.

18. The slider of claim 16 wherein the at least one trench is positioned proximate to the trailing end of the slider body.

19. The slider of claim 16 wherein the slider body includes at least one landing pad elevated from the raised bearing surface.

20. The slider of claim 16 wherein the width dimension is approximately 1 micron or less.

* * * * *